July 18, 1944.   C. K. NEWCOMBE   2,353,966
LIQUID COOLING SYSTEM FOR INTERNAL COMBUSTION ENGINES
Filed Jan. 21, 1942    3 Sheets-Sheet 1

INVENTOR
CLARE KENZIE NEWCOMBE
BY
Young, Emery & Thompson
ATTYS.

July 18, 1944.     C. K. NEWCOMBE     2,353,966

LIQUID COOLING SYSTEM FOR INTERNAL COMBUSTION ENGINES

Filed Jan. 21, 1942     3 Sheets-Sheet 3

INVENTOR

CLARE KENZIE NEWCOMBE

BY
Young, Emery & Thompson
ATTYS.

Patented July 18, 1944

2,353,966

UNITED STATES PATENT OFFICE 2,353,966

LIQUID COOLING SYSTEM FOR INTERNAL-COMBUSTION ENGINES

Clare Kenzie Newcombe, Lancashire, England, assignor to Heat Pumps Limited, London, England a British company Application January 21, 1942, Serial No. 427,644
In Great Britain January 24, 1941

9 Claims. (Cl. 123—174)

This invention comprises improvements in liquid cooling apparatus for use in combination with internal-combustion engines, particularly aircraft engines.

The present invention provides in, or for use in, combination with an internal-combustion engine particularly for aircraft, cooling apparatus employing a refrigerant fluid arranged to receive heat from the engine installation, and at least one heat pump or compressor, preferably of the injector type, arranged to raise the temperature and pressure level of the fluid heated in part of the apparatus.

More particularly the cooling apparatus according to the invention comprises a low temperature heat exchanger in which heat from the engine installation is transmitted to the refrigerant fluid, at least one heat pump or compressor, preferably of the injector type, arranged to boost the temperature and pressure level of the refrigerant fluid, and a high temperature heat exchanger arranged to receive and reject the heat from the heat pump or compressor to the atmosphere, with or without a pump for circulating the refrigerant fluid through the low pressure side of the apparatus.

The cooling apparatus may receive heat from the engine installation in various ways. It may, for example, be employed as the direct means of cooling the engine cylinders, the refrigerant fluid being circulated in the cylinder jackets which thus form the aforesaid low temperature heat exchanger. Again, the apparatus may be used as an indirect means of cooling the engine. It will be realized that some refrigerant fluids eminently suitable from considerations of their chemical properties might attain pressures considered too high for existing cylinder jacket constructions. In such cases the difficulty may be overcome, according to the invention, by maintaining the existing cooling circulation of, say, water or ethylene glycol and cooling that medium in the low temperature heat exchanger referred to above. Again, the aforesaid cooling apparatus may be arranged as an inter-cooler for air supplied by a supercharger to the combustion space of the engine. Such an arrangement may comprise a spray chamber through which the engine air charge may be passed on its way from the supercharger to the engine and in which water, brine or other liquid coolant such as engine fuel is sprayed into direct contact with the air, the coolant being circulated through the aforesaid low temperature heat exchanger which receives the refrigerant fluid. In a further application of the invention, the cooling apparatus may be arranged as an oil cooler for cooling the lubricating oil used in the engine.

The above devices, i. e. inter-coolers, oil coolers and the like, may be employed singly or in any desired combination and in conjunction with an engine cooling system which may either be of the normal type or may embody the cooling apparatus of the invention.

Preferably in carrying out the invention the motive power of the heat pump is pressure vapour generated from the same refrigerant fluid as is circulated in the low temperature heat exchanger. Any convenient source of heat energy may be employed for generating the motive pressure vapour for driving the heat pump, but according to a feature of the invention the heat in the engine exhaust gases is utilised for this purpose. For example, the apparatus may include an exhaust-gas heated boiler comprising a pipe coiled round the exhaust manifold of the engine, one end of the pipe being connected to a by-pass from the refrigerant system and the other end terminating in the heat pump motive nozzle.

Any convenient type of vapour injector pump may be employed, for example it may be constructed in the same manner as the known steam jet injection pumps. Jet compressors work most satisfactorily at low compression ratios and accordingly in carrying out the invention it may be necessary or desirable to provide a series of heat pumps operating in successive compression stages to boost the temperature and pressure of the vaporized refrigerant to the required level.

Another feature of the invention relates to the construction of the high temperature heat exchanger which may be one of the known types of air-cooled radiator or condenser which is advantageously disposed in the wing of the aircraft.

A preferred form of high temperature heat exchanger may comprise a set of jacketed tubes so arranged that air flows through the centre and over the outsides of the jackets, while the vapour to be condensed flows through the jacket spaces. A supply of suitable liquid is introduced to flow along the airswept surfaces replacing the usual air boundary layer with one of liquid, thereby materially reducing the resistance to heat flow due to the increased conductivity of the liquid which may be any non-freezing liquid of high conductivity and low vapour pressure at the temperatures of 200 to 400° F. The air flow over the fluid surface will tear particles out into the main stream and so the outlet cross-sections may be fitted with baffle plates or centrifugal separators to conserve the fluid which can be recirculated by means of a collecting tank and small pump.

Any of the fluid refrigerant media that are commonly employed in refrigerating apparatus comprising evaporative elements of the so-called "flooded" type may be employed as the cooling medium in the apparatus of the present invention, it being necessary to select a substance which, under operation conditions, will produce the desired cooling effect and which has no deleterious effect upon the structural elements of the cooling system. Preferably, the cooling medium is one of the Freon group such as Freon 12 (dichloro-difluoro-methane). However, other known refrigerant liquids can also be employed, for example, methyl bromide and carbon tetrachloride.

Some examples according to the invention will now be described with reference to the accompanying diagrams, in which Figure 1 shows the application of the invention to the direct cooling of the engine cylinder;

Like reference numerals indicate like parts throughout the figures.

Figure 1:
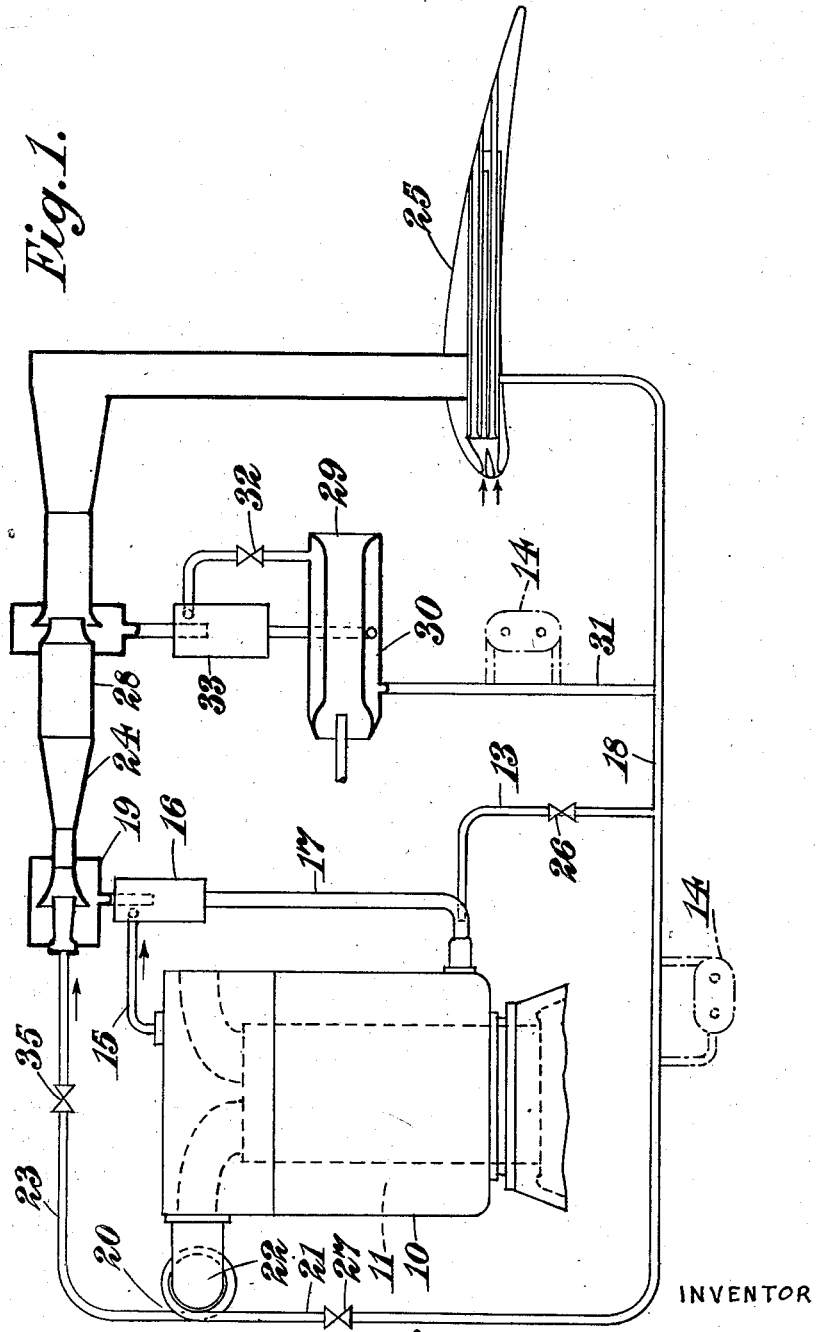

In the first example (Figure 1) each cylinder 10 is provided with a jacket 11 for the circulating liquid which in this case is a liquid refrigerant of the type already referred to. The liquid enters the jacket through an inlet pipe 13 due to the pressure drop across the expansion valve 26. The vapour evaporated in the cylinder jacket is drawn off through an exit pipe 15 to a separator 16 from which any liquid carried over is returned by a pipe 17 to the low pressure side of the expansion valve 26. The vapour from the separator 16 is passed to an injector-type heat pump or other compressor 19, the motive power for which is provided by pressure vapour generated in an exhaust-gas heated boiler 20. The boiler may be formed by coiling a liquid supply pipe 21 or by forming a jacket round the exhaust manifold 22, the boiler being fed with liquid refrigerant from the high pressure line 18 through the expansion valve 27. The pressure in the boiler is controlled by the valve 35 in the pipe line 23. Vapour from the boiler is delivered by the pipe 23 to the injector 19 where it entrains vapour from the engine cylinder, and the mixture is then passed through a diffuser tube 24 and finally to a condenser 25, forming the high temperature heat exchanger already referred to. The condensate from the condenser is returned to the high pressure supply pipe 18.

The pump 19 operates to entrain and compress the refrigerant vapour from the separator 16, at the same time considerably increasing its temperature. In this way there is supplied to the condenser 25 a vapour under comparatively high temperature and pressure. The important advantage of this becomes apparent when it is considered that the heat transfer in a condenser or radiator is directly proportional to the product of the difference in temperature between the heat-exchanging media and the effecting cooling area of the condenser or radiator. In the case of the use, in an aircraft engine cooling system, of a condenser in the form of a radiator cooled by atmospheric air (which may be at a temperature of the order of 5° F.) it is necessary in known liquid cooling systems to employ a comparatively large radiator since the liquid cooling medium from which heat must be extracted before it returns to the cylinder jacket is supplied to the radiator at a temperature not much greater than 212° F. In the cooling system of the present invention, however, the cooling medium in the form of pressure vapour is at a temperature which may be of the order, for example of 385° F.; accordingly, with a much greater difference in temperature between the cooling air and the vapour to be cooled, it is possible (even though a certain amount of heat is introduced into the system from the motive vapour of the pump) to reduce the effective area of the radiator by about half, with the important advantage of reducing the weight of the radiator and the resistance to forward motion or drag.

In some cases it may be necessary or desirable to employ several compression stages, and in Figure 1 a second such stage indicated at 28 is shown. If desired, a separate burner-fired boiler such as 29 may be arranged to supply motive vapour for this subsequent stage. The boiler 29 which may be fired by engine fuel has a jacket 30 fed with the liquid refrigerant from a pipe 31 fitted with a control valve 32 and communicating with the main high pressure supply pipe 18. Pressure vapour generated in the boiler 29 is then passed through a separator 33 to the second stage pump 28.

The condenser 25 may be of any desired construction. In Figure 1 it is shown as a set of specially shaped jacketed tubes connected by common gas and liquid headers. The cooling air and liquid pass through the centre of the tubes and the refrigerant vapour condenses in the jackets as previously described. It is known that by suitably arranging the exhaust pipes of aircraft engines reaction propulsion can be obtained from the exhaust gas momentum which increases the total thrust obtained from the engine.

A thrust can also be obtained from the condenser if the tube walls are shaped to provide a diffuser at the entry with subsequent heating and expansion of the cooling air. The compression attainable is limited by the dynamic head and the air leaving temperature is small so that the overall thermal efficiency is also small.

Figure 2:
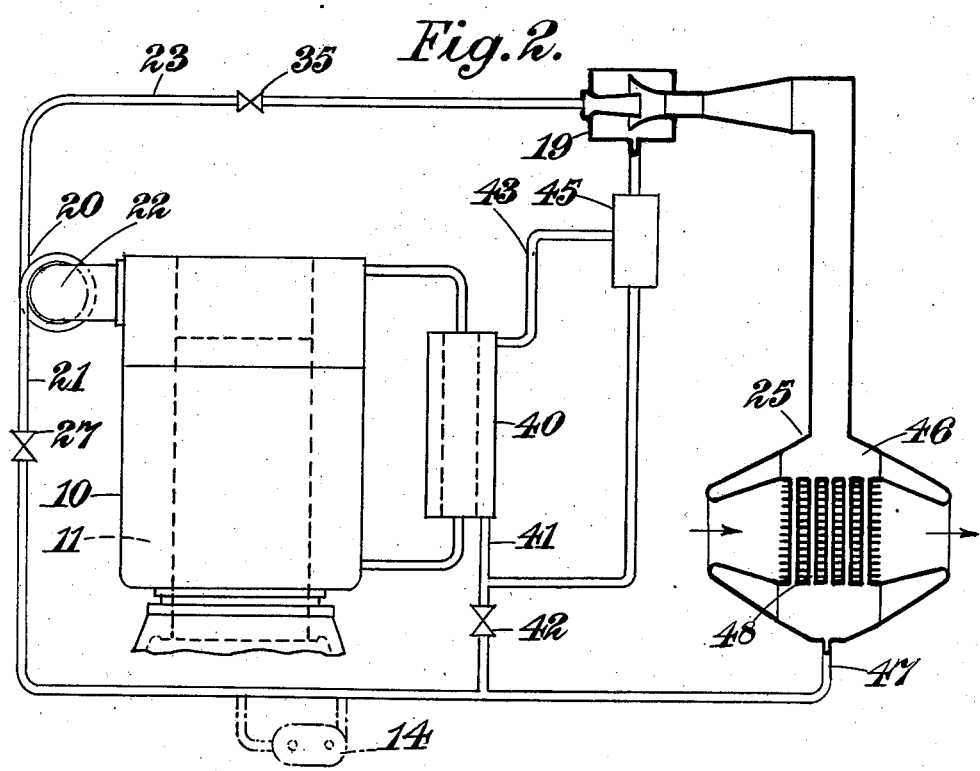
Figure 2 shows the apparatus applied to the indirect cooling of the engine cylinder.

In the arrangement diagrammatically illustrated in Figure 2, a normal cooling circulation of, say, water or glycol is maintained in the cylinder jacket 11 and this cooling medium is cooled by passage through a separate heat exchanger 40 which is in the form of a jacketed chamber, through the jacket of which the liquid refrigerant is circulated. The liquid is supplied to the jacket by a pipe 41 controlled by a valve 42 and the vapour generated in the jacket is passed by a pipe 43 to a separator 45 from which the vapour is entrained by a heat pump or compressor 19, the motive power for which is obtained in the same way as before, namely, from an exhaust-gas heated boiler 20 supplied with the liquid refrigerant from the high pressure line. The vapour mixture delivered by the pump or compressor 19 is passed to a condenser 25 which in this case is shown as an extended surface condenser comprising upper and lower headers 46, 47 connected by a series of parallel pipes 48 and so arranged that atmospheric air may circulate over the connected pipes. In order to increase the efficiency of the radiator, the arrangement may include means for bathing the surfaces of the connecting pipes 48 by a film of non-freezing liquid cooling medium. Alternatively, the header connecting tubes 48 may be jacketed, a film of non-freezing cooling medium flowing through the tubes while the vapour to be cooled and condensed flows in the jacket spaces, these being suitably connected in the upper and lower headers. If desired, the external walls of the jackets may be furnished with spines, in the manner described in the specification accompanying my application for British Letters Patent No. 17,476/40, dated December 9, 1940, in order to increase the heat transfer.

Figure 3:
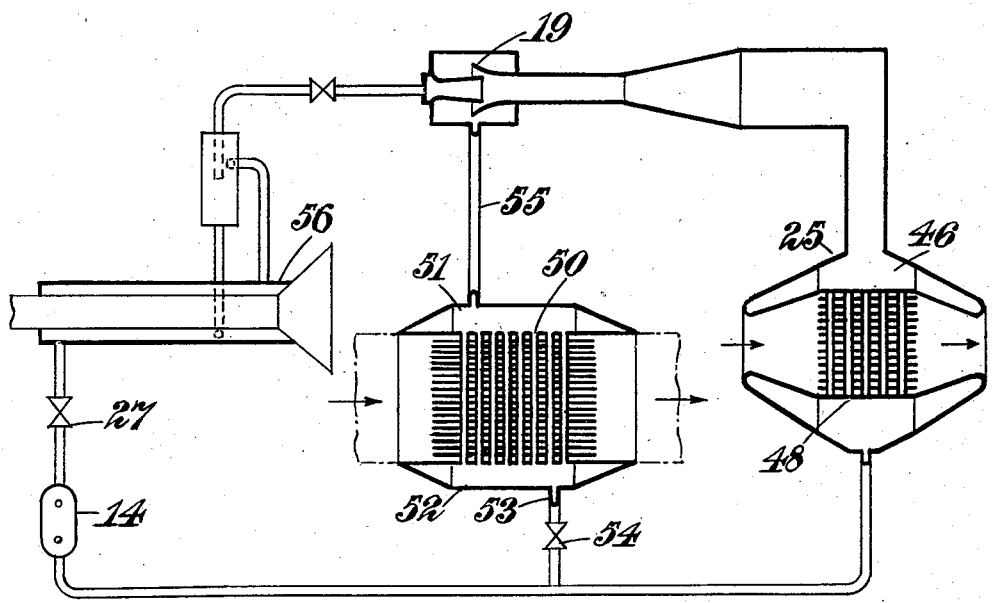
Figure 3 shows the apparatus used as an intercooler.

In Figure 3 the cooling apparatus of the invention is arranged to constitute an inter- or charge-cooler for air supplied by a supercharger to the combustion space of the engine. The inter-cooler is shown as comprising a battery of pipes 50 connected by headers 51, 52, the air from the supercharger being arranged to pass over the exterior surfaces of the connecting pipes 50, while the liquid refrigerant is passed through the interior of the connecting tubes. The refrigerant is supplied to the inter-cooler by a pipe 53 controlled by a valve 54, vapour from the cooler being drawn off by a pipe 55 and entrained by a heat pump or compressor 19 from which the combined vapours are passed to a condenser 25. In the illustrated example of this application of the invention, the heat pump 19 is shown as supplied with motive power generated in a separate burner-fired boiler 56, but an exhaust-gas heated boiler may, if desired, be employed in the same manner as before.

Figure 4:
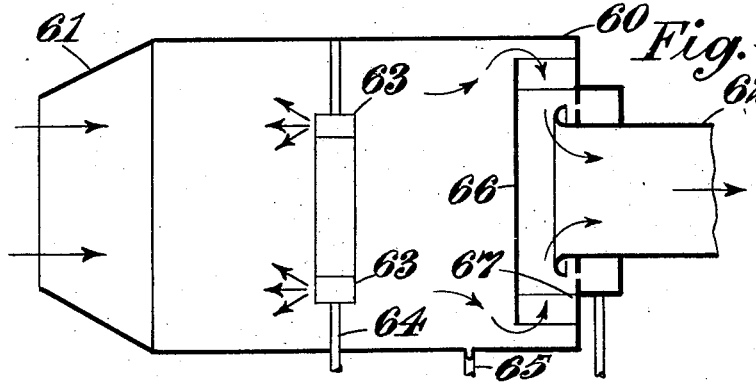
Figure 4 shows a spray chamber which may be used in conjunction with the apparatus of Figure 3.

In some cases it may be desirable in operating an inter-cooler to pass the air through a spray chamber in which water or a suitable fluid comes into direct contact with the air from the superchargers, the air or fluid being in turn cooled by passage through a heat interchanger (e. g., similar to 40 in Figure 2) cooled by the liquid refrigerant. Figure 4 illustrates diagrammatically a spray chamber suitable for this purpose. The air from the superchargers is arranged to enter the spray chamber 60 at one end 61 and after cooling to be delivered to the engine through a pipe 62. In passing through the chamber the air is sprayed from jets 63 with water or fluid supplied from the cooler from a pipe 64. The water or fluid is returned to the cooler by a pipe 65. The outlet end of the spray chamber is fitted with a baffle plate 66 and before the air reaches the outlet pipe 62, it is caused to pass through tangential slots in a ring 67 at the periphery of the baffle plate. A ring of slots is arranged to permit the escape of liquid which is collected in an annulus as shown.

With appropriate modification, the arrangement described with reference to Figure 3 may be utilised as an oil cooler for cooling the lubricating oil used in the engine. Alternatively, the cooling effect of the liquid refrigerant in any of the arrangements already described may in addition be utilised for cooling any auxiliary plant such as oil coolers. If necessary the apparatus may include in each case a liquid circulating pump or pumps 14 for the liquid refrigerant.

I claim:

1. The combination with an internal-combustion engine of a cooling apparatus for that engine comprising a low temperature heat-exchanger in which a refrigerant fluid is circulated and which is so arranged that the fluid will receive heat from the engine installation, at least one heat pump of the injector type arranged to boost the temperature and pressure level of the refrigerant fluid, the motive power of the heat pump being pressure vapour generated from the same refrigerant fluid as is circulated in the low temperature heat-exchanger, and a high temperature heat-exchanger arranged to receive and reject the heat from the heat pump to the atmosphere.

2. The combination with an internal-combustion engine of a cooling apparatus for that engine comprising a low temperature heat-exchanger in which a refrigerant fluid is circulated and which is so arranged that the fluid will receive heat from the engine installation, at least one heat pump of the injector type arranged to boost the temperature and pressure level of the refrigerant fluid, the motive power of the heat pump being pressure vapour generated, in a boiler heated by the engine exhaust gas, from the same refrigerant fluid as is circulated in the low temperature heat-exchanger, and a high temperature heat-exchanger arranged to receive and reject the heat from the heat pump to the atmosphere.

3. The combination with an internal-combustion engine of cooling apparatus for that engine applied directly to the cooling of the engine cylinder and comprising a low temperature heat-exchanger in the form of a jacket round the engine cylinder in which jacket a refrigerant fluid is circulated, at least one heat pump of the injector type arranged to boost the temperature and pressure level of the refrigerant fluid, the motive power of the heat pump being pressure vapour generated from the same refrigerant fluid as is circulated in the low temperature heat-exchanger, and a high temperature heat-exchanger arranged to receive and reject the heat from the heat pump to the atmosphere.

4. The combination with an internal-combustion engine of a cooling apparatus for that engine applied indirectly to the cooling of the engine cylinder and comprising a low temperature heat-exchanger arranged to transfer heat from a liquid cooling medium circulated in the engine cylinder jackets to a refrigerant fluid, at least one heat pump of the injector type arranged to boost the temperature and pressure level of the refrigerant fluid, the motive power of the heat pump being pressure vapour generated from the same refrigerant fluid as is circulated in the low temperature heat-exchanger, and a high temperature heat-exchanger arranged to receive and reject the heat from the heat pump to the atmosphere.

5. The combination with an internal-combustion engine of apparatus for cooling air supplied to that engine, said apparatus comprising a low temperature heat-exchanger arranged to transfer heat from the air supply aforesaid to a refrigerant fluid circulated in the heat-exchanger, at least one heat pump of the injector type arranged to boost the temperature and pressure level of the refrigerant fluid, the motive power of the heat pump being pressure vapour generated from the same refrigerant fluid as is circulated in the low temperature heat-exchanger and a high temperature heat-exchanger arranged to receive and reject the heat from the heat pump to the atmosphere.

6. The combination with an internal-combustion engine of apparatus for cooling air supplied to that engine, said apparatus comprising a low temperature heat-exchanger in which a refrigerant fluid is circulated, and a spray chamber through which the air supply aforesaid is passed on its way to the engine and in which a liquid coolant is sprayed into direct contact with the air, the coolant being circulated through the aforesaid low temperature heat-exchanger wherein it transfers heat to the refrigerant fluid, at least one heat pump of the injector type arranged to boost the temperature and pressure level of the refrigerant fluid, the motive power of the heat pump being pressure vapour generated from the same refrigerant fluid as is circulated in the low temperature heat-exchanger and a high temperature heat-exchanger arranged to receive and reject the heat from the heat pump to the atmosphere.

7. The combination with an internal-combustion engine of apparatus for cooling lubricating oil used in that engine, said apparatus comprising a low temperature heat-exchanger arranged to transfer heat from the lubricating oil aforesaid to a refrigerant fluid circulated in the exchanger, at least one heat pump of the injector type arranged to boost the temperature and pressure level of the refrigerant fluid, the motive power of the heat pump being pressure vapour generated from the same refrigerant fluid as is circulated in the low temperature heat-exchanger and a high temperature heat-exchanger arranged to receive and reject the heat from the heat pump to the atmosphere.

8. The combination with an internal-combustion engine of a cooling apparatus for that engine comprising a low temperature heat-exchanger in which a refrigerant fluid is circulated and which is so arranged that the fluid will receive heat from the engine installation, a series of injector-type heat pumps operating in successive compression stages to boost the temperature and pressure level of the refrigerant fluid, the motive power of the heat pumps being pressure vapour generated from the same refrigerant fluid as is circulated in the low temperature heat-exchanger, and a high temperature heat-exchanger arranged to receive and reject the heat from the heat pump to the atmosphere.

9. The combination with an internal-combustion engine of a cooling apparatus for that engine comprising a low temperature heat-exchanger in which a refrigerant fluid is circulated and which is so arranged that the fluid will receive heat from the engine installation, at least one heat pump of the injector type arranged to boost the temperature and pressure level of the refrigerant fluid, the motive power of the heat pump being pressure vapour generated from the same refrigerant fluid as is circulated in the low temperature heat-exchanger, and a high temperature heat-exchanger which is arranged to receive and reject the heat from the heat pump to the atmosphere and which consists of jacketed tubes so arranged that air and a non-freezing liquid flow through the tubes and over the outside surfaces of the jacket, while the vaporized refrigerant to be condensed flows through the jacket spaces.

CLARE KENZIE NEWCOMBE.